March 13, 1951     O. BELKE ET AL     2,545,066
COUPLING PIN
Filed Aug. 1, 1947
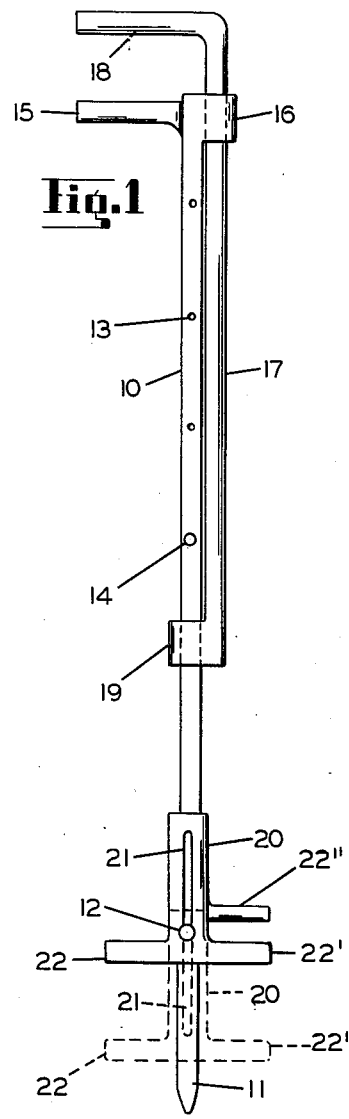
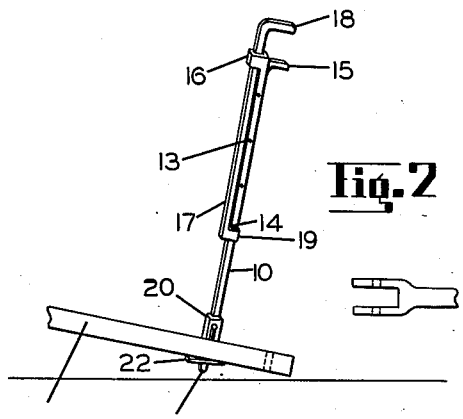
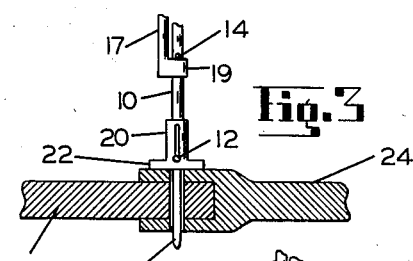
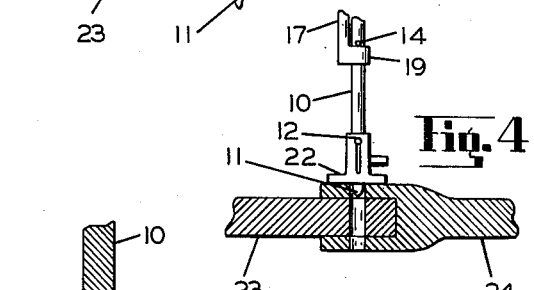
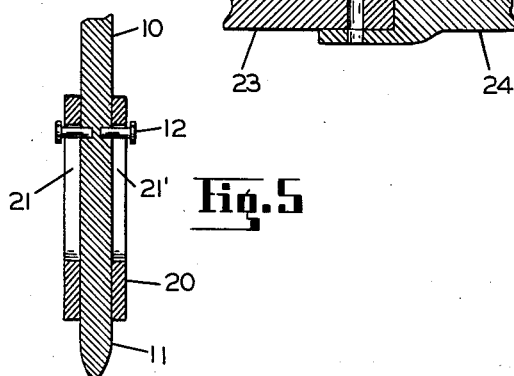
INVENTORS
OTIS BELKE
WILLIAM PINNOW
BY
Christian R. Nielsen
ATTORNEY.

Patented Mar. 13, 1951

2,545,066

UNITED STATES PATENT OFFICE 2,545,066

COUPLING PIN

Otis Belke, Helenville, and William Pinnow, Rome, Wis.

Application August 1, 1947, Serial No. 765,364

1 Claim. (Cl. 280—33.15)

Our invention relates to coupling pins and more particularly to an implement that facilitates the coupling together of two vehicles.

The object of our invention is to provide a coupling pin that forms an integral portion of a manually operated tool.

Another object of our invention is to provide a device that has a pin equipped with a slidably mounted lifting member employed for adjusting and engaging the tongue of a farm implement or the like, to the draw bar of a tractor.

A still further object of our invention is to provide a device that may be adjusted to length, to provide ease of manipulation.

Still another object of our invention is to provide a device that may be operated with one hand, is economical and easy to manufacture, and will function perfectly for the purpose for which it is intended.

It is manifest to anyone familiar with farm implements or the like, that it is often quite laborious and inconvenient to join a trailing implement with the draw bar of the tractor, and it is imperative for the operator of the tractor to step down from the seat of the tractor to make the necessary coupling. With the device described and claimed herein, it is possible for the operator to maintain his position on the seat of the tractor while lifting the tongue of the implement into engagement with the draw bar of the tractor and placing the coupling pin in position, or reversing the operation when disengagement of the tongue from the draw bar is desired, without stepping off of the tractor.

Other and further objects of our invention will become more apparent as the description proceeds and when taken in conjunction with the drawings in which Figure 1 is a side view of the assembled device showing the adjustment and travel of the lifting member.

Figure 2 is a side view of the device showing the tongue of an implement being lifted from the ground for engagement with the draw bar of a truck.

Figure 3 is a fragmentary cross-sectional view of the tongue and draw bar in engagement, and the pin portion of the device inserted into position.

Figure 4 is a similar view as shown in Figure 3, with the apertures of the tongue and draw bar registering with one another and the pin ready for engagement, and Figure 5 is a fragmentary cross-sectional view of the pin and slot arrangement of the lifting end.

Similar characters of reference indicate corresponding parts throughout the several views, and referring now to the same, the character 10 shows a main bar member having a pin 11 at its lower end. The main bar member 10 is preferably constructed of square metal and is provided with a guide pin 12, and a plurality of apertures 13. These apertures extend through the member 10 and are arranged for receiving the pin 14 as shown in Figures 3 and 4.

The upper end of the main bar member 10 is equipped with an outwardly extending grip member 15 and a loop member 16 disposed oppositely to the grip member 15. There is an auxiliary bar member 17 also shown provided with a grip member 18 extending outward therefrom, to register with the grip member 15 on the bar member 10. This auxiliary bar member 17 passes through and is held in slidable engagement with the loop member 16 on the bar member 10 and is provided with a similar loop member 19 at the forward end and encircling the main bar member 10.

The lifting member 20 slidably surrounds the pin member 11, which is preferably of a round contour, and is held in engagement by means of the guide pin 12 which enters into engagement with a pair of longitudinal slots 21 and 21' through the cylindrical wall of the lifting member 20. The lower portion of the lifting member 20 has outwardly extending arms 22 and 22' forming an integral portion of the lifting member 20, and a projecting member 22'' on one side of the lifting member 20 is employed for lifting a clevis or the like. This member 22'' is also shown integrally formed with the lifting member 20.

In operation, the pin 14 may be inserted into any one of the apertures 13, thereby limiting slidable action of the members 10 and 17. The operator manipulates the device by means of the grip portions 15 and 18, and as the lifting member 20 is downwardly disposed as shown in Figure 2, it is possible by employing the members 22 and 22', to lift the tongue 23 of an implement from the ground, and place it into proper relation with the draw bar 24 of the tractor, so that the apertures in both the tongue 23 and the draw bar 24 are in alignment with one another, at which time the pin 11 is inserted, as shown in Figure 3, thereby causing the lift member 22 to be raised on the pin 11 of the main bar member 10.

In the chosen embodiments of our invention there are present many features not heretofore disclosed in the prior art, and although we have shown a particular and specific construction, we are fully cognizant of the fact that many changes in their form and configuration may be made without in any way effecting their operativeness and without departing from the spirit of our invention or the scope of our appended claim.

Having thus described our invention, what we claim and desire to secure by Letters Patent in the United States is:

A coupling pin for use between two vehicles comprising in combination a main bar, an auxiliary bar, said auxiliary bar slidably supported by said main bar, means for limiting slidable movement of said auxiliary bar whereby said coupling may be adjusted for length, grip members extending outward from said main bar and auxiliary bar in alignment with one another, said main bar terminating into an integral pin member at its lower end, a lifting member slidably mounted on said pin member, means for governing the movement of said lifting member, and a plurality of outwardly projecting members extending from said lifting member at the lower end thereof.

OTIS BELKE.
WILLIAM PINNOW.

REFERENCES CITED

The following references are of record in the file of this patent:

UNITED STATES PATENTS

| Number | Name | Date |
| --- | --- | --- |
| 190,392 | Weldon | May 1, 1877 |
| 1,783,189 | Green | Dec. 2, 1930 |
| 2,072,391 | Varney | Mar. 2, 1937 |
| 2,256,310 | Braley et al. | Sept. 16, 1941 |
| 2,383,786 | Gish | Aug. 28, 1945 |